Sept. 8, 1964  A. CLARKSON  3,147,939
PITCH AND ALTITUDE CONTROL SYSTEM
Filed Dec. 3, 1962  4 Sheets-Sheet 1

INVENTOR.
ALICK CLARKSON
BY
Knox & Knox

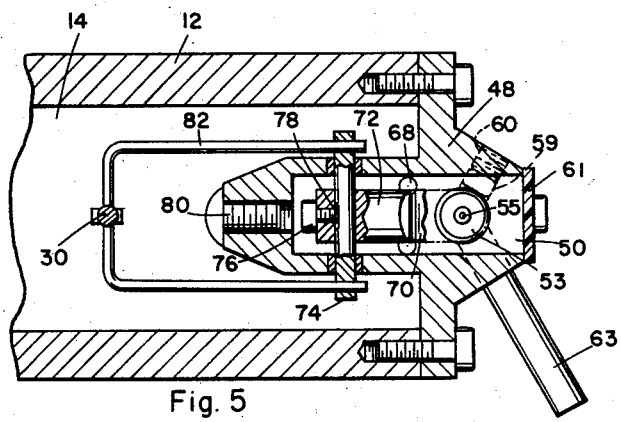
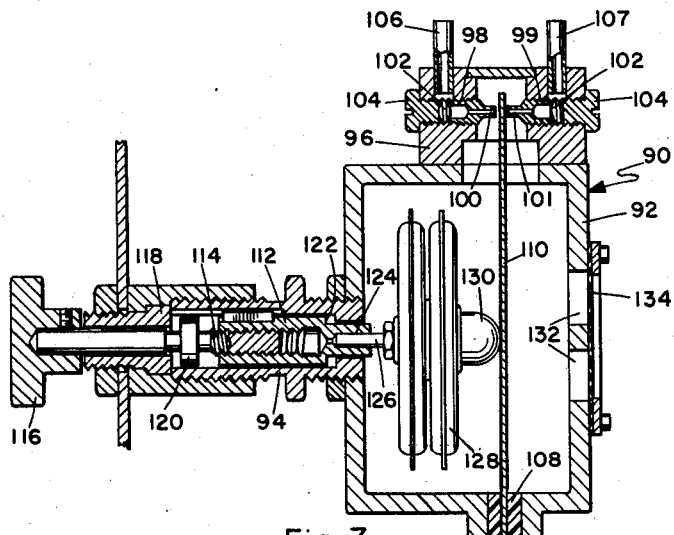
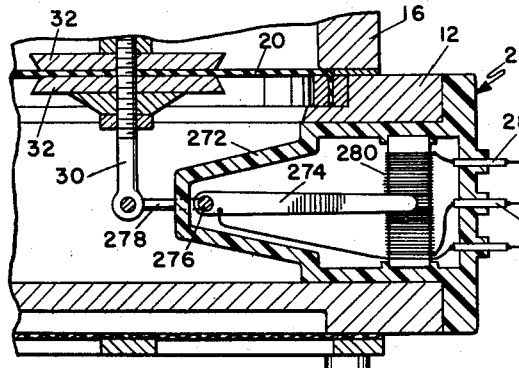
INVENTOR.
ALICK CLARKSON
BY Knox & Knox

Sept. 8, 1964  A. CLARKSON  3,147,939
PITCH AND ALTITUDE CONTROL SYSTEM
Filed Dec. 3, 1962  4 Sheets-Sheet 3

INVENTOR.
ALICK CLARKSON
BY
Knox & Knox

Sept. 8, 1964 A. CLARKSON 3,147,939
PITCH AND ALTITUDE CONTROL SYSTEM
Filed Dec. 3, 1962 4 Sheets-Sheet 4
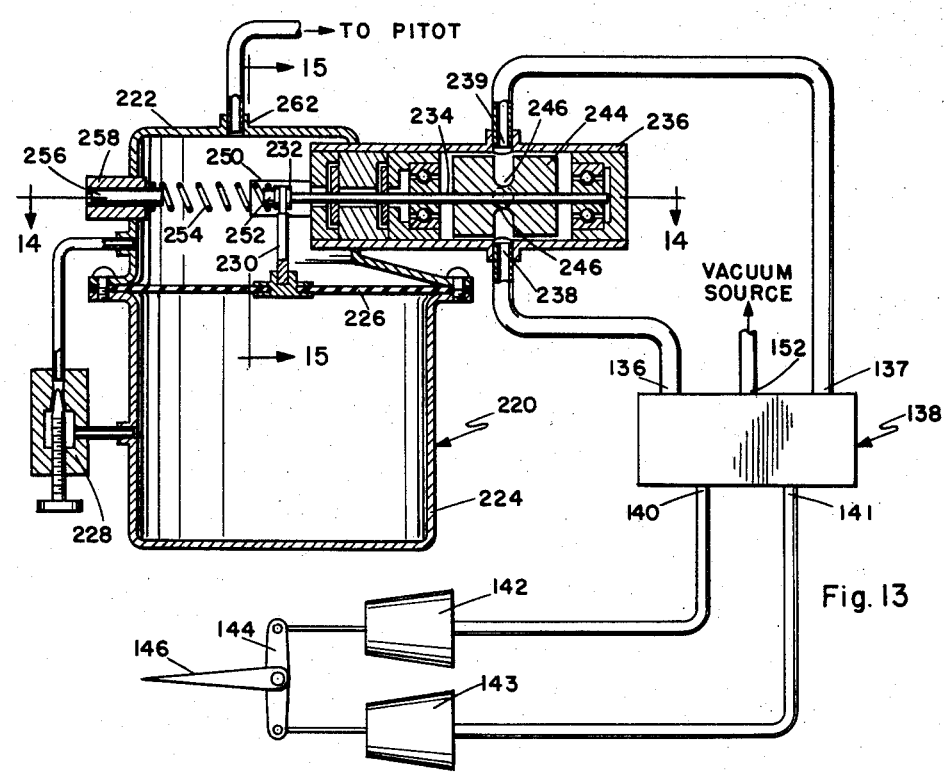
Fig. 13
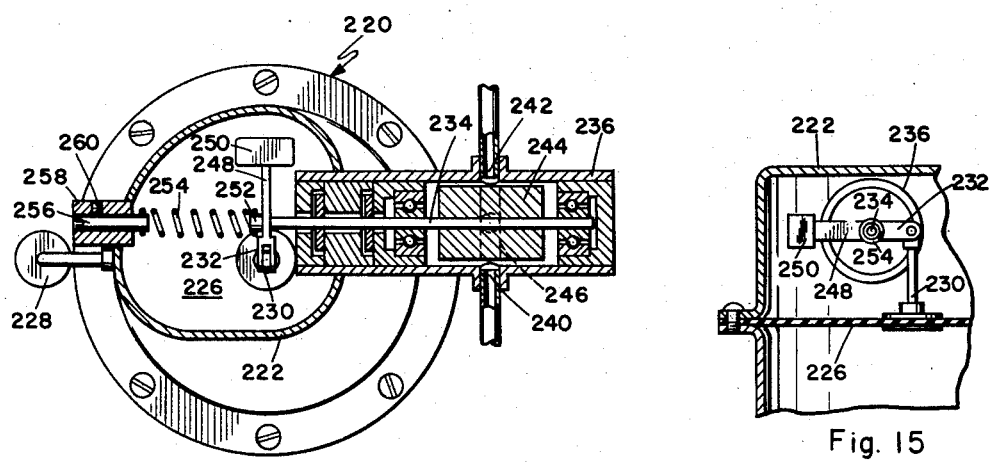
Fig. 14
Fig. 15
INVENTOR.
ALICK CLARKSON
BY
Knox & Knox United States Patent Office 3,147,939
Patented Sept. 8, 1964

3,147,939
PITCH AND ALTITUDE CONTROL SYSTEM
Alick Clarkson, Paul Spur, Ariz., assignor to Karl Frudenfeld, Hawthorne, Calif.
Filed Dec. 3, 1962, Ser. No. 241,750
8 Claims. (Cl. 244—78)

The present invention relates generally to aircraft instruments and more particularly to an altitude control system.

The primary object of this invention is to provide an altitude control system incorporating a pitch control unit having a pressure sensitive moving element which is inertially damped to avoid oscillation or hunting of the controls.

Another object of this invention is to provide an altitude control system which utilizes a pressure type airspeed sensing pick-up, the inertially damped moving element being coupled directly to output means which governs the control operation.

Another object of this invention is to provide an altitude control system including an altitude holding unit by which a specific altitude can be selected and maintained.

A further object of this invention is to provide an altitude control system which is adaptable to many different types of aircraft and does not interfere with normal control operation.

Finally, it is an object to provide an altitude control system of the aforementioned character which is simple and convenient to manufacture and install and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 5 is a sectional view taken on line 5—5 of FIGURE 3;

FIGURE 6 is an end elevation view of an altitude holding unit;

FIGURE 7 is an enlarged sectional view taken on line 7—7 of FIGURE 6;

FIGURE 13 is a partially diagrammatic sectional view of an alternative form of pitch control unit;

FIGURE 14 is a sectional view taken on line 14—14 of FIGURE 13;

FIGURE 15 is a sectional view taken on line 15—15 of FIGURE 13; and

FIGURE 16 is a sectional view similar to a portion of FIGURE 3, showing the adaptation to electrically operated controls.

Similar characters of reference indicate similar or identical elements and portions throughout the specification and through the views of the drawing.

*Pitch Control Unit*

Figure 1:
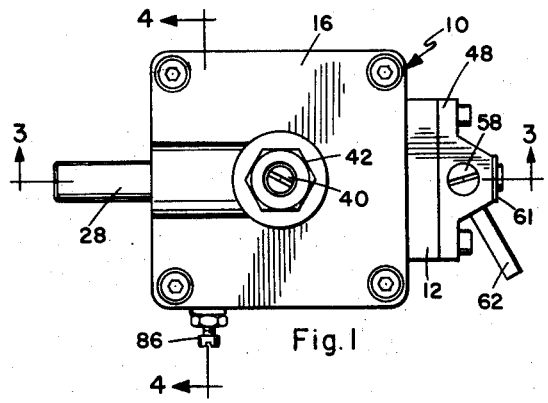
FIGURE 1 is a top plan view of the preferred form of the pitch control unit.
Figure 2:
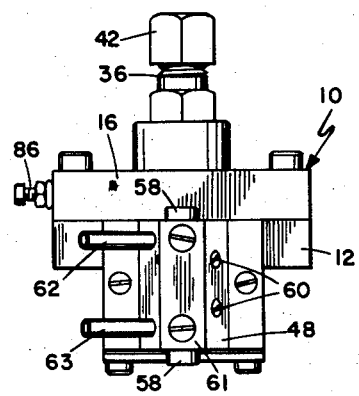
FIGURE 2 is an end elevation view thereof.
Figure 3:
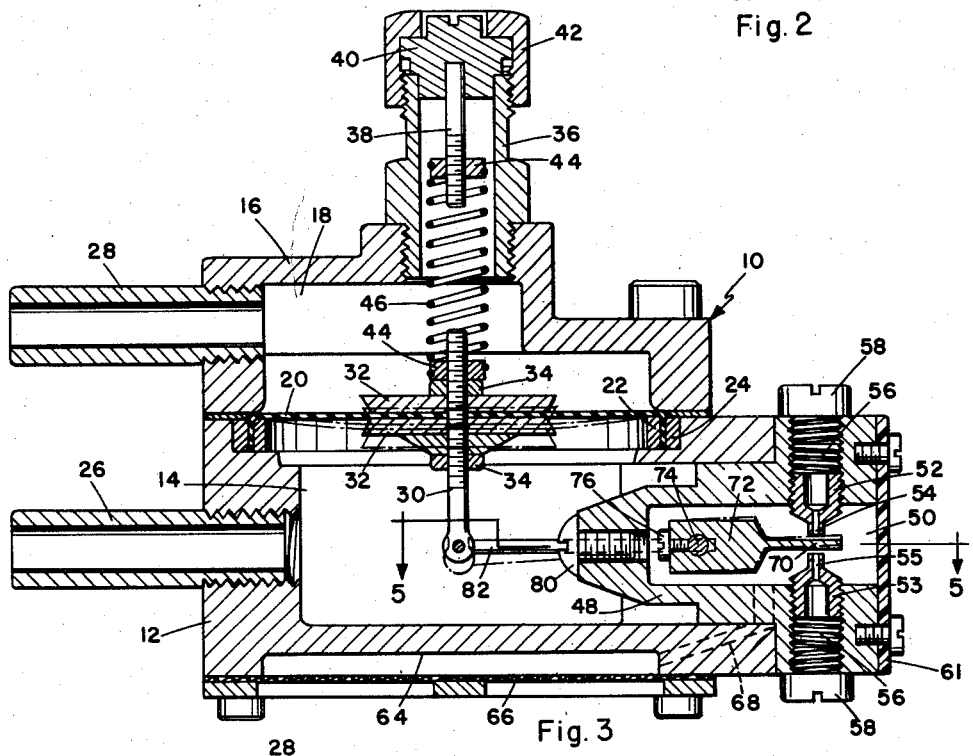
FIGURE 3 is an enlarged sectional view taken on line 3—3 of FIGURE 1.
Figure 4:
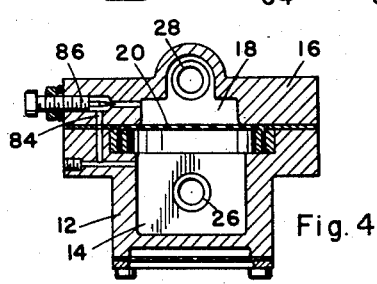
FIGURE 4 is a sectional view taken on line 4—4 of FIGURE 1.

Referring to FIGURES 1–5 of the drawings, the pitch control unit 10 comprises a main casing 12 containing a pressure chamber 14 and a top cap 16 containing a static chamber 18. The unit is equipped with an air-speed sensitive moving element which may take the form of a resilient diaphragm 20 which is peripherally secured between concentric retaining rings 22 and 24 and which separates the chambers 14 and 18, the assembly being tightly held in sealed relation between the casing 12 and top cap 16 when they are secured together. Chamber 14 is provided with a pressure inlet 26 and chamber 18 has a vent 28. Extending through the center of diaphragm 20 is a threaded actuating rod 30 and mounted on the rod on each side of the diaphragm are inertial masses 32, illustrated as flat, washer-like elements, the masses being secured by nuts 34 on said rod. On top of the top cap 16 is an upwardly extending sleeve 36 in which is an adjustment screw 38 having a large head 40 and being held by a clamp nut 42. On the adjustment screw 38 and on the upper end of actuating rod 30 are threaded collars 44, which are grooved externally to receive the opposite ends of a tension spring 46. The spring 46 supports or biases the weight of the inertial masses 32 and holds the diaphragm 20 in a flat neutral position, the tension being variable to suit by means of adjustment screw 38.

In one end of casing 12 is fitted an inwardly extending valve body 48 having an inner cylindrical cavity 50, the axis of which is perpendicular to the axis of actuating rod 30. Near the outer end of valve body 48 are diametrically opposed orifice plugs 52 and 53 having small opposed orifices 54 and 55 opening into cavity 50, said plugs being screw threaded into threaded sockets 56 for adjustment and the sockets being closed by sealing screw 58. Orifice plugs 52 and 53 are locked in place by clamp pads 59 held by lock screws 60 inserted laterally, as indicated in FIGURE 5. The outer end of cavity 50 is closed by an end plate 61. Fixed in the valve body 48 and communicating with the orifice plugs 52 and 53 are vacuum outlets 62 and 63. The lower portion of casing 12 has a shallow depression 64 covered by a filter 66 and air passages 68 extend through said casing and the valve body 48 to cavity 50. Thus when vacuum is applied to outlets 62 and 63, air is drawn in through passages 68.

Inside the cavity 50 is valve element comprising a control blade 70 extending between the orifices 54 and 55, said blade having an enlarged hub 72 secured on a hinge pin 74 pivotally mounted transversely across the inner end of valve body 48 perpendicular to the axis of said orifices. The hub 72 is secured by a screw 76 engaging a flat portion 78 on hinge pin 74, the inner end of valve body 48 being fitted with a plug screw 80 for access to screw 76. Pivotally attached to the lower end of actuating rod 30 is generally V-shaped yoke 82, the ends of which are fixed into the ends of hinge pin 74. Vertical motion of actuating rod 30 thus rotates hinge pin 74 and swings the control blade 70 up and down between orifices 54 and 55.

Chambers 14 and 18 are interconnected by a balancing passage 84 which is provided with an adjustable needle valve 86 to allow a very slight controlled leak between the chambers, the reason for which will be hereinafter apparent.

*Altitude Holding Unit*

The pitch control unit 10 will maintain an aircraft in level flight and an altitude control unit 90 is used in conjunction therewith to set the altitude at which level flight is maintained. As illustrated in FIGURES 6 and 7, the altitude control unit 90 comprises a cylindrical casing 92 having a cylindrical sleeve 94 extending axially from one side thereof. At one position on the periphery of casing 92 is a valve block 96 containing a pair of orifice plugs 98 and 99 having orifices 100 and 101 opposed on an axis parallel to the axis of sleeve 94. The orifice plugs 98 and 99 are adjustable in threaded sockets 102 closed by sealing screws 104 and extending from valve block 96 are vacuum outlets 106 and 107 communicating with said orifice plugs. In the casing 92 diametrically opposite the valve block 96 is a retaining block 108 in which is fixed an elongated, resilient control blade 110 extending between the orifices 100 and 101 and constituting a valve element.

In sleeve 94 is an axially slidable plunger 112 actuated by an adjustable screw 114 having a control knob 116, said adjustment screw passing through a retaining plug 118 and having a stop collar 120 to limit outward travel. The inner end of plunger 112 has a shoulder 122 which limits inward travel and is provided with an axial socket 124. Seated in the socket 124 is a stem 126 connected to one side of an aneroid bellows capsule 128, the other side having a boss 130 which bears against the control blade 110. Casing 92 has vents 132 covered by a filter 134 to admit ambient air.

Control System

Figure 8:
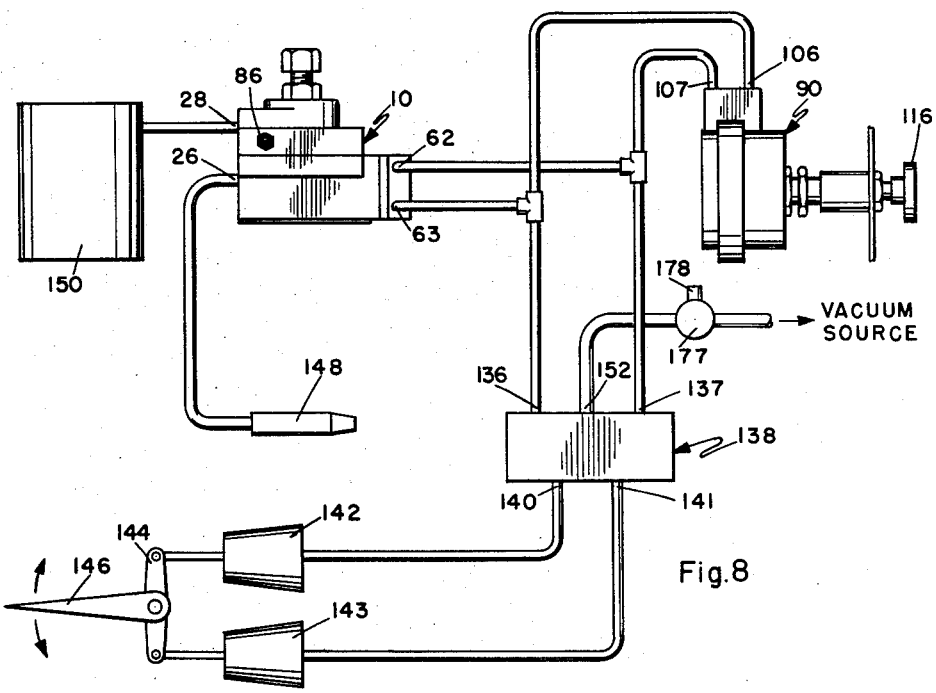
FIGURE 8 is a diagram of the altitude control system.

In the control system illustrated in FIGURE 8, the outlets 62 and 63 of pitch control unit 10 and the outlets 106 and 107 of altitude holding unit 90 are coupled in parallel to the inlets 136 and 137 of a pneumatic relay 138. The outlets 140 and 141 of relay 138 are connected to vacuum operated push-pull actuators 142 and 143 which, in turn, are mechanically coupled to the control horn 144 of an aircraft elevator 146. Pressure inlet 26 of pitch control unit 10 is connected to an airspeed sensing element, such as Pitot 148, while vent 28 is connect to a reasonably large rate chamber 150, which can be a simple closed can. Relay 138 has a vacuum inlet 152 connected to a suitable source of vacuum such as a venturi, not shown.

Figure 9:
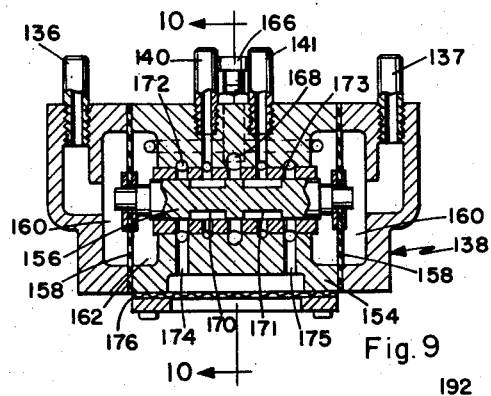
FIGURE 9 is a longitudinal sectional view of a pneumatic relay used in the system.
Figure 10:
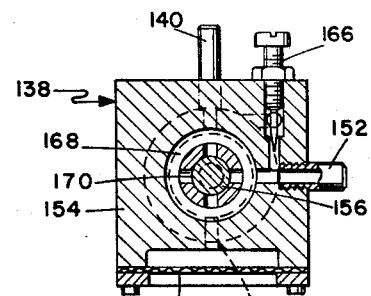
FIGURE 10 is a sectional view taken on line 10—10 of FIGURE 9.

The relay 138, as illustrated in FIGURES 9 and 10, comprises a body 154 having therein an axially slidable valve element 156 which is connected at its end to a pair of resilient diaphragms 158 secured peripherally to the body. Each diaphragm has a pressure chamber 160 on one side and a vent chamber 162 on the other side. Vacuum inlet 152 is coupled to both vent chambers 162 through a needle valve 166 to center the valve element 156 and is also coupled to an annular channel 168 surrounding the central portion of said valve element. Inlets 136 and 137 connect with the pressure chambers 160 and apply pressure changes to the diaphragms 158. Outlets 140 and 141 extend to the valve element 156 and are axially spaced on opposite sides of channel 168. Valve element 156 has a pair of annular grooves 170 and 171 which, when the valve element moves axially, connect the vacuum inlet 152 to one or the other of outlets 140 and 141, so applying vacuum to actuators 142 and 143 selectively. Outwardly spaced from grooves 170 and 171 are vent channels 172 and 173 communicating with atmosphere through vents 174 and 175, which are covered by a filter 176. When one of the outlets 140 or 141 is connected to the vacuum inlet 152, the other is connected to the respective vent 174 or 175. The relay structure is substantially conventional and other similar types of pneumatic relays can be used. A shut-off valve 177 can be located at any convenient position between the vacuum source and inlet 152, with a vent 178 to atmosphere when the system is not in use.

System Operation

In flight, any changes in airspeed are detected by Pitot 148 as variations in air pressure and these variations are applied to the pressure chamber 14, causing displacement of the diaphragm 20. If the aircraft climbs the speed will be reduced and the pressure will drop in the pressure chamber 14, the now higher pressure in static chamber 18 forcing diaphragm 20 down, as indicated in broken line in FIGURE 3. The resultant downward motion of actuating rod 30, acting on yoke 82, makes the control blade 70 swing upwardly and obstruct the upper orifice 54, so causing more air to be drawn through the lower orifice 55. The unequal pressure on relay 138 results in vacuum being applied to the lower actuator 143, turning the elevator 146 down and bringing the aircraft out of its climb. When level flight is resumed, the pressures will be equalized and the elevator returned to neutral.

If the aircraft dives the pressure in chamber 14 will increase and an opposite action will apply up elevator to return the aircraft to level flight. The inertial masses 32 are very important in the action since they damp out up or down motions of the aircraft due to their inertia and are biased to a neutral position by spring 46. Thus an upward surge of the aircraft will be damped by the inertia of masses 32 tending to remain at rest, the action damping all fluctuations of the diaphragm against excess movement yet allowing ample freedom for proper control operation. It has been found in flight tests that the operation is smooth and continuous, the high degree of sensitivity and rapid response providing pitch stabilization corrections in small increments rather than sudden large corrections at intervals. Due to the inertial damping there is no tendency for the system to overcontrol any correction and cause hunting or oscillation. The system is of course intended for use in level crusing flight in the manner of an auto pilot and would not normally be in operation during intentional and considerable changes in speed, as at take-off and landing or during maneuvers.

The pitch control unit 10 maintains the aircraft in flight at any altitude once the aircraft is stablized at a particular altitude. Pressure changes in chamber 14 due to changes in altitude rather than speed are relatively slow and the needle valve 86 allows air to leak between chambers 18 and 14 to balance the pressures at any particular altitude, the leak being too small to interfere with pressure changes by speed variations. The rate chamber 150 acts as a large cushion and absorbs sudden pressure changes in the rather small static chamber 18 due to sharp maneuvers or atmospheric conditions.

To hold a specific altitude the barometric type altitude holding unit 90 is used. The desired altitude can be set by turning control knob 116, which can be provided with a calibrated dial if desired. If ambient pressure in the casing 92 is not appropriate for the selected altitude, the resultant expansion or contraction of capsule 128 from normal will cause the blade 110 to be moved toward either orifice 100 or 101, allowing more air to be drawn through the more exposed orifice. This will result in a correcting action to the appropriate actuator 142 or 143, in addition to that applied by pitch control unit 10, until the proper altitude is reached and the pressures in casing 92 and capsule 128 are balanced. The blade 110 will then be centered between orifices 100 and 101 and any deviations from the selected altitude will be sensed by the capsule 128, resulting in corrective control application.

If it is desired to hold the aircraft at its present altitude at any time, without specifically setting the altitude in feet, the control knob 116 can be turned until a slight corrective response is felt in the controls and then centered by feel at that point, the operation being quick and very simple to perform. This avoids the necessity for a dial and accurate calibration of the unit. When the system is not in use the shut-off valve 174 can be turned to vent the vacuum source to atmosphere, the venting incorporated into relay 138 allowing the actuators 142 and 143 to move freely and follow manual control movements.

Modified Altitude Holding Unit

Figure 11:
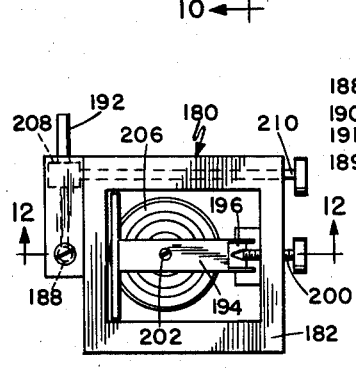
FIGURE 11 is a top plan view of an alternative altitude holding unit.
Figure 12:
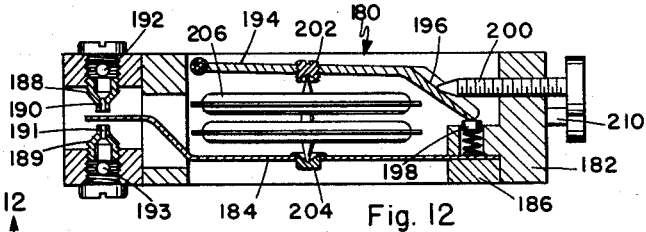
FIGURE 12 is an enlarged sectional view taken on line 12—12 of FIGURE 11.

An alternative form of the altitude holding unit is illustrated in FIGURES 11 and 12. The unit 180 has a casing 182 open to atmosphere and in which is mounted a resilient control blade 184 held at one end by a retaining block 186. The other end of blade 184 extends as a valve element between a pair of orifice plugs 188 and 189 having orifices 190 and 191, the orifice plugs communicating with vacuum outlets 192 and 193. Also mounted in frame 182 is a pressure plate 194 spaced from the blade 184 and pivotally attached to the frame at the end remote from block 186. The free end of pressure plate 194 has an inclined ramp portion 196, the tip of which rests on a spring biased plunger 198 to bias the plate outwardly. Extending through the frame 182 is an adjustment screw 200 engaging ramp portion 196 so that, as the screw is advanced, the pressure plate 194 is forced inwardly. The pressure plate 194 and blade 184 are fitted with opposed cups 202 and 204, between which is held a bellows capsule 206. Vacuum outlets 192 and 193 lead to a shut-off valve 208 of any suitable type, preferably with a simple push-pull action, which is operated by a control rod 210.

The altitude holding unit 180 can be connected into the system illustrated in FIGURE 8 in place of the unit 90. Altitude is set by the screw 200 which adjusts the pressure on capsule 206 through pressure plate 194, the action being similar to that of unit 90.

Modified Pitch Control Unit

The pitch control unit 220 illustrated in FIGURES 13–15 is basically similar to that illustrated and described in U.S. Patent No. 3,012,741 for a Pitch Attitude Stabilizing System for Aircraft, but has been adapted to incorporate inertial damping. Briefly, the unit 220 comprises a pressure chamber 222 and a static chamber 224 separated by a resilient diaphragm 226 and interconnected through a bleed valve 228 for altitude stabilization, as in unit 10. Attached to the center of diaphragm 226 is an actuating rod 230 connected to a crank arm 232 projecting radially from a valve stem 234, which is axially rotatable in a cylindrical valve body 236 extending from the pressure chamber 222. Valve body 236 has a pair of diametrically opposed vacuum outlets 238 and 239, with a vacuum inlet 240 and a vent 242 diametrically opposed in the same plane as said outlets but on an axis perpendicular to the axis of the outlets. Fixed to stem 234 is a cylindrical valve element 244 having transverse slots 246 in the plane of vacuum outlets 238 and 239, so that rotation of the valve element, by motion of diaphragm 226 through actuating rod 230 will connect either of said vacuum outlets with either the vacuum inlet 240 or the vent 242.

Extending from crank arm 232 on the opposite side of valve stem 234 is a balance arm 248 carrying an inertial mass 250. It is quite important to note that the mass 250 is considerably greater than that needed for mere balancing of the diaphragm 226 and its linkage. On the stem 234 is a boss 252 to which is secured one end of a bias spring 254 of the torsion type, the other end of said spring being fixed to an adjustment pin 256 extending through a bushing 258 in the side of pressure chamber 222. The adjustment pin 256 can be turned to adjust the spring 254 so that the diaphragm 226 is held in neutral position, the pin being secured in place by a set screw 260.

The unit 220 is coupled to the control system in a similar manner to the unit 10, vacuum outlets 238 and 239 being connected to the inlets 136 and 137 of relay 138 and pressure chamber 222 having a pressure inlet 262 from a Pitot or the like. Either altitude holding unit 90 or 180 can be interconnected with unit 220, but are omitted from FIGURE 13 for simplicity. The operation is similar to that of pitch control unit 10, movements of the aircraft affecting the diaphragm 226 being inertially damped or compensated for by the mass 250.

With the vacuum actuated controls the entire system can be operated from a single vacuum source and is independent of the existing aircraft services. There is no interference with normal operation of the conventional controls and manual control will over-ride the system at any time in the event of an emergency. When not in use the system is vented to atmosphere and offers virtually no resistance to control operation. The components are small, the connections simple and the system is adaptable to many types of aircraft.

To extend the versatility of the system, however, the pitch control unit 10 can be adapted to operate electrically actuated controls, which may be fitted to some aircraft and in which vacuum actuators would be unnecessary duplication of control surface operating means. This is accomplished by replacing the valve body 48 by an electrical pick-off 270 having a body 272 shaped to fit into casing 12 in place of the valve body, as in FIGURE 16. Inside body 272 is a wiper arm 274 pivotally mounted on a pin 276, which is coupled by a yoke 278 to actuating rod 30. Thus movement of diaphragm 20 swings the wiper arm 274 which rides on a voltage dividing resistance 280, the end connections 282 and 284 of which lead to the electrical control actuators of the particular aircraft, not shown. The wiper arm 274 is connected to an electrical power source 286, the voltage differential between the wiper arm and the two end connections 282 and 284 providing the necessary output to operate controls.

Other types of electrical pick-offs capable of providing differential outputs may be equally suitable, a strain gauge type of motion sensing means being one example. Other examples include a tuned reed vibrating between spaced contacts and coupled to the inertially damped diaphragm to provide a modulated type of electrical output. Or a simple induction type pick-off can be used, with an armature coupled to the diaphragm and moving in the field of electrical pick-off coils. The basic pitch control mechanism remains unchanged, the type of output being variable to suit requirements.

It is understood that minor variation from the form of the invention disclosed herein may be made without departure from the spirit and scope of the invention, and that the specification and drawings are to be considered as merely illustrative rather than limiting.

I claim:
1. An altitude control system for aircraft, comprising:
 a pitch control unit having a movable pressure sensing element;
 airspeed sensing means for detecting air pressure changes caused by variations in airspeed;
 said airspeed sensing means being coupled to said pressure sensing element;
 an inertial mass mounted on said pressure sensing element to damp motions thereof;
 bias means connected to said inertial mass to hold the mass and said pressure sensing element in a neutral position;
 and control means connected to said pressure sensing element to operate in response to movements of said element from neutral position.
2. An altitude control system for aircraft, comprising:
 a pitch control unit having a movable pressure sensing element;
 airspeed sensing means for detecting air pressure changes caused by variations in airspeed;
 said airspeed sensing means being coupled to said pressure sensing element;
 an inertial mass mounted on said pressure sensing element to damp motions thereof;
 bias means connected to said inertial mass to hold the mass and said pressure sensing element in a neutral position;

control means connected to said pressure sensing element to operate in response to movements of said element from neutral position;

and selectively variable altitude sensing means connected to said control means in parallel with said pressure sensing element.

3. An altitude control system for aircraft, comprising:
a pitch control unit having a movable airspeed sensing element;
an inertial mass mounted on said sensing element to damp the motions thereof;
said pitch control unit having vacuum outlets for connection to vacuum operated aircraft pitch control means;
valve means controlling the opening and closing of said vacuum outlets;
said valve means being connected to said sensing element to open and close said vacuum outlets in response to the movement of the sensing element.

4. An altitude control system for aircraft, comprising:
a pitch control unit having a movable aircraft sensing element;
an inertial mass mounted on said sensing element to damp the motions thereof;
bias means connected to said inertial mass to hold the mass and said sensing element in neutral position;
said pitch control unit having vacuum outlets for connection to vacuum operated aircraft pitch control means;
valve means controlling the opening and closing of said vacuum outlets;
said valve means being connected to said sensing element to open and close said vacuum outlets in response to the movements of the sensing element.

5. An altitude control system for aircraft, comprising:
a pitch control unit having a pressure chamber and a static chamber;
an airspeed sensitive pressure pick-up connected to said pressure chamber;
a resilient diaphragm fixed between and separating said pressure and static chambers;
an inertial mass mounted on said diaphragm to damp the motions thereof caused by pressure changes;
bias means connected to said inertial mass to hold said diaphragm in a neutral position;
said pitch control unit having vacuum outlets for connection to vacuum operated aircraft pitch control means;
valve means controlling the opening and closing of said vacuum outlets;
said valve means being connected to said diaphragm and being responsive to the movements thereof.

6. An altitude control system for aircraft, comprising:
a pitch control unit having a pressure chamber and static chamber;
an airspeed sensitive pressure pick-up connected to said pressure chamber;
a resilient diaphragm fixed between and separating said pressure and static chambers;
an inertial mass attached to said diaphragm to damp the motions thereof caused by pressure changes;
bias means connected to said inertial mass to hold said diaphragm in a neutral position;
said pitch control unit having vacuum outlets for connection to vacuum operated aircraft pitch control means;
valve means controlling the opening and closing of said vacuum outlets;
said valve means being connected to said diaphragm and being responsive to the movements thereof;
an altitude holding unit having further vacuum outlets for connection in parallel with said pitch control unit vacuum outlets;
said altitude holding unit having an altitude sensitive valve controlling the opening and closing of the vacuum outlets therein.

7. An altitude control system according to claim 6 and including:
vacuum operated actuating means connected to the pitch control surfaces of the aircraft;
a pneumatic relay having a source of vacuum connected thereto;
said pitch control unit and said altitude holding unit having their vacuum outlets connected in parallel, through said relay, to said actuating means.

8. An altitude control system for aircraft, comprising:
a pitch control unit having a movable airspeed sensing element;
an inertial mass mounted on said sensing element to damp the motions thereof;
bias means connected to said inertial mass to hold the mass and said sensing element in neutral position;
said pitch control unit having vacuum outlets for connection to vacuum operated aircraft pitch control means;
valve means controlling the opening and closing of said vacuum outlets;
said valve means being connected to said sensing element to open and close said vacuum outlets in response to the movements of the sensing element;
an altitude holding unit having an altitude sensitive valve;
said altitude holding unit having vacuum outlets controlled by said altitude sensing valve and being connected in parallel with the vacuum outlets of said pitch control unit, whereby said altitude holding unit and said pitch control unit combined operate the aircraft pitch control means.

References Cited in the file of this patent

UNITED STATES PATENTS

| | | |
|---|---|---|
| Re. 24,597 | Lones et al. | Feb. 3, 1959 |
| 2,176,807 | Wunsch | Oct. 17, 1939 |
| 2,620,149 | Strother | Dec. 2, 1952 |
| 2,701,111 | Schuck | Feb. 1, 1959 |
| 2,940,316 | Carey | June 14, 1960 |
| 3,012,741 | Clarkson | Dec. 12, 1961 |
| 3,013,834 | Minicucci | Dec. 19, 1961 |
| 3,071,337 | Harcum | Jan. 1, 1963 |